United States Patent
Hattori et al.

(10) Patent No.: US 7,202,901 B1
(45) Date of Patent: Apr. 10, 2007

(54) VIDEO CAMERA WITH STOWABLE MONITOR HAVING DISPLAY FACING INWARDLY OR OUTWARDLY

(75) Inventors: Mitsuo Hattori, Gifu (JP); Tomohiro Harata, Kanagawa (JP); Koji Yaginuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/927,447

(22) Filed: Sep. 11, 1997

Related U.S. Application Data

(62) Division of application No. 08/541,126, filed on Oct. 11, 1995, now Pat. No. 5,739,859.

(30) Foreign Application Priority Data

Oct. 21, 1994 (JP) .................................. 06-281522

(51) Int. Cl.
*H04N 5/222* (2006.01)
(52) U.S. Cl. ................................. 348/333.06
(58) Field of Classification Search ........... 348/333.06, 348/333.07, 333.01
See application file for complete search history.

(56) References Cited

FOREIGN PATENT DOCUMENTS

| DE | 3918279 | * | 6/1989 |
|---|---|---|---|
| JP | 1-169418 | * | 6/1994 |

* cited by examiner

*Primary Examiner*—Tuan Ho
(74) *Attorney, Agent, or Firm*—Jay H. Maioli

(57) ABSTRACT

A video camera has a video camera body having a storage region in a side surface thereof, an imaging unit housed in the video camera body for imaging an object and generating a video signal, and an electronic viewfinder for monitoring the video signal generated by the imaging unit. An angularly movable support supports a side edge of the electronic viewfinder for angular movement about a first axis to move an opposite side edge of the electronic viewfinder away from the storage region. An auxiliary angularly moving mechanism angularly moves the electronic viewfinder about a second axis perpendicular to the first axis, so that one of face and back sides of the electronic viewfinder can be selected for storage into the storage region.

7 Claims, 11 Drawing Sheets

VIDEO CAMERA WITH STOWABLE MONITOR HAVING DISPLAY FACING INWARDLY OR OUTWARDLY

This is a division of application Ser. No. 08/541,126 filed Oct. 11, 1995 now U.S. Pat. No. 5,739,859.

BACKGROUND OF THE INVENTION

1. Field of the Invention

The present invention relates to a video camera, and more particularly to a video camera having an electronic viewfinder that can be opened and closed and that is also rotatably mounted on a video camera body for increased visibility of the electronic viewfinder and adapting the electronic viewfinder to various modes of use of the video camera.

2. Description of the Related Art

Some small-size video cameras that have been available in recent years have an electronic viewfinder (hereinafter referred to as an "EVF") comprising a liquid crystal display unit (hereinafter referred to as an "LCD") integrally coupled externally to a video camera body.

One such video camera comprises two casings integrally coupled to each other by a joint means, one of the casings serving as a video camera body and the other casing as an EVF unit. The video camera body has a lens system, a CCD (charge-coupled device), etc. accommodated therein. The EVF unit mainly has an EVF and a mechanism for recording and playing a video tape, etc. accommodated therein.

Another such video camera comprises a lens system, a CCD, a mechanism for recording and playing a video tape, etc. accommodated in the casing of a video camera body, and a large-size EVF added externally to the video camera body separately in addition to a viewfinder.

In the former conventional video camera in which the EVF is integrally joined to the video camera body, the EVF unit is only openable and closable or rotatable with respect to the video camera body, and suffers limitations on the freedom of angular adjustments of the EVF unit for increased visibility of the EVF unit when the video camera is in use.

In some video cameras of the latter conventional design, the EVF is stored in position on the video camera body with the display surface facing outwardly. The display surface of the EVF thus tends to become damaged or smeared with dust, and the LCD itself is liable to be damaged. According to another video camera arrangement, the EVF is stored in position on the video camera body with the display surface facing inwardly to avoid the above problem. However, when the EVF is stored in position with the display surface facing inwardly, the user of the video camera cannot see the display surface of the EVF, and cannot use the video camera as it is, thus posing another problem.

SUMMARY OF THE INVENTION

It is therefore an object of the present invention to provide a video camera which has an electronic viewfinder mounted on a side surface of a video camera body for angular movement about a first axis into and out of a storage recess defined in the side surface of the video camera body and also about a second axis substantially perpendicular to the first axis when the electronic viewfinder is positioned out of the storage recess.

According to the present invention, there is provided a video camera comprising a video camera body having a storage region in a side surface thereof, imaging means housed in the video camera body for imaging an object and generating a video signal, an electronic viewfinder for monitoring the video signal generated by the imaging means, an angularly movable support for supporting a side edge of the electronic viewfinder for angular movement about a first axis to move an opposite side edge of the electronic viewfinder away from the storage region, and auxiliary angularly moving means for angularly moving the electronic viewfinder about a second axis perpendicular to the first axis, so that one of the face and back sides of the electronic viewfinder can be selected for storage into the storage region.

According to the present invention, there is also provided a video camera comprising a video camera body having a storage recess defined in a side surface thereof, an electronic viewfinder pivotally mounted on the video camera body for monitoring a video signal representative of an image of an object, and means operatively connected between the video camera body and the electronic viewfinder, for allowing the electronic viewfinder to move angularly into and out of the storage recess about a first axis and also to move angularly about a second axis substantially perpendicular to the first axis when the electronic viewfinder is positioned out of the storage recess.

The electronic viewfinder is thus angularly movable in two directions, i.e., a first direction to move the opposite side thereof away from the storage region in the side surface of the video camera body, and a second direction about an axis perpendicular to the axis about which the opposite side of the electronic viewfinder is movable away from the storage region, and one of the face and back sides of the electronic viewfinder can be selected for storage into the storage region. Consequently, when the electronic viewfinder is stored with its display surface facing inwardly, the display surface thereof is prevented from being damaged, scratched, or smeared with dust. When the electronic viewfinder is stored with its display surface exposed for view, the electronic viewfinder can be used while it is in storage.

Furthermore, the display surface of the electronic viewfinder can be adjusted freely to achieve an angle for best visibility according to the angle at which the video camera is directed to the object to be imaged.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

FIGS. 1 through 7 show a video camera 1 according to an embodiment of the present invention.

Figure 1:
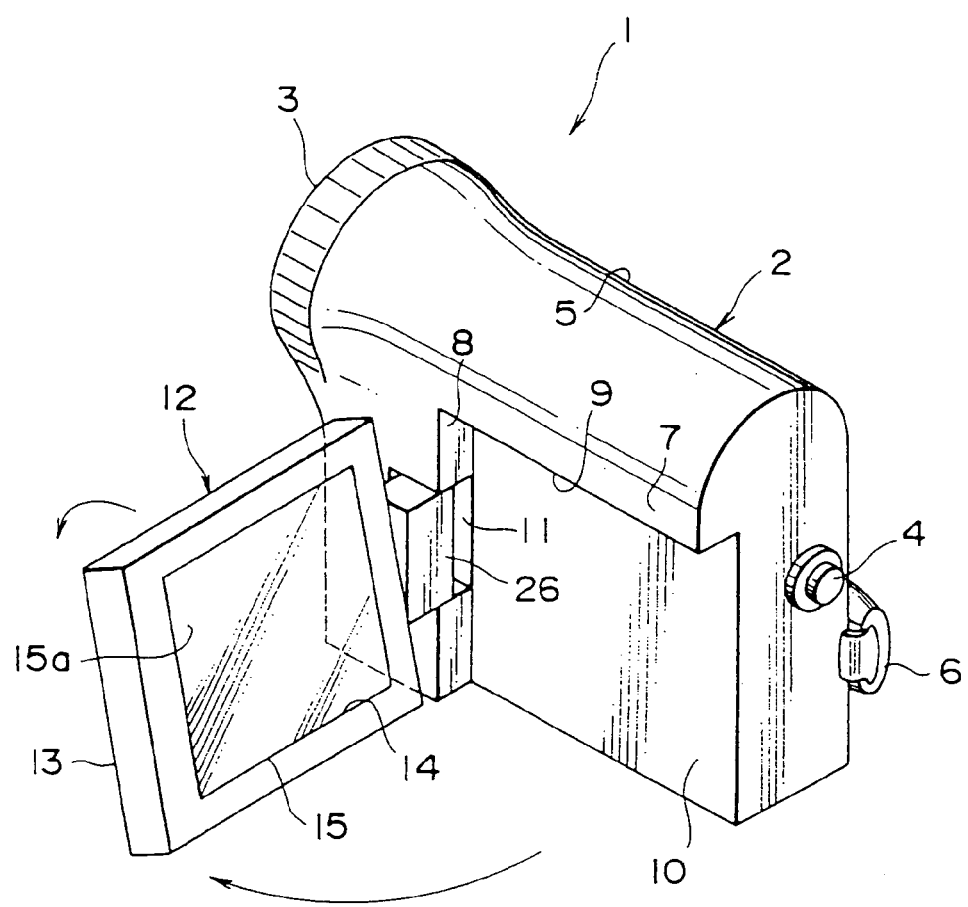
FIG. 1 is a perspective view of a video camera according to an embodiment of the present invention.
Figure 2:
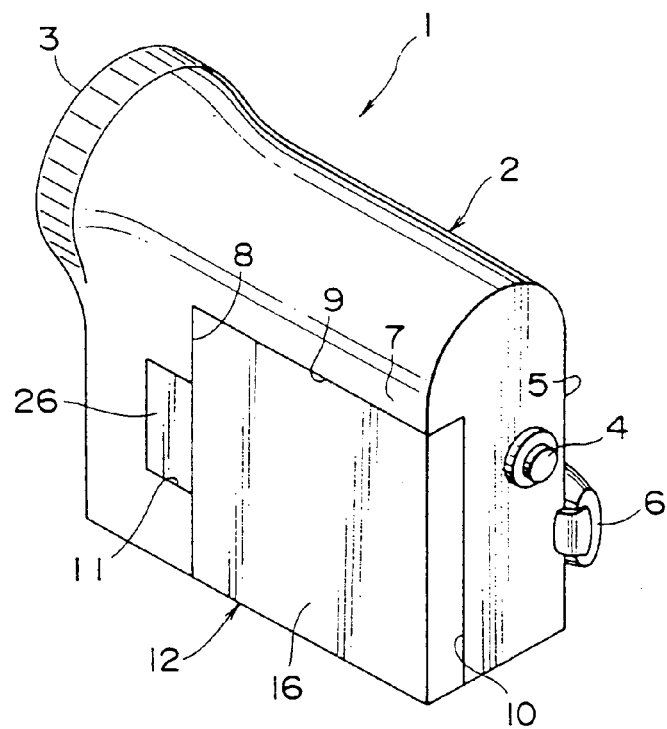
FIG. 2 is a perspective view of the video camera, showing an EVF as it is stored.
Figure 3:
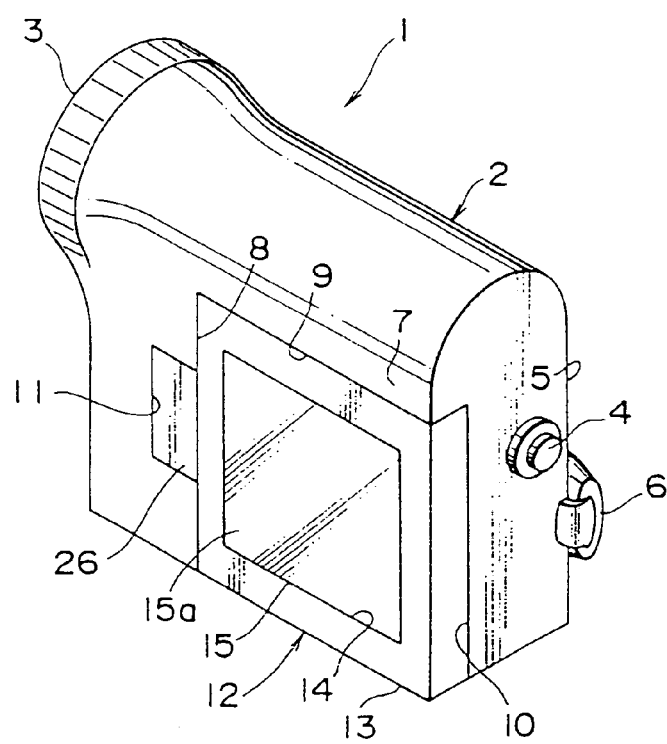
FIG. 3 is a perspective view of the video camera, showing the EVF as it is stored in a direction opposite to the direction in which it is stored as shown in FIG. 2.

As shown in FIGS. 1 through 3, the video camera 1 has a video camera body 2 made of synthetic resin. The video camera 1 has a lens system 3 for capturing an optical image of an object, a built-in microphone (not shown), etc. which are mounted on a front surface of the video camera body 2, a start/stop switch 4, which is mounted on a rear surface of the video camera body 2, and a grip belt 6 for holding the video camera 1, which is attached to a right side surface 5 of the video camera body 2.

The video camera body 2 has front and upper steps 8, 9 on a left side surface 7 thereof, defining a storage recess 10 that is open leftwardly, rearwardly, and downwardly.

The left side surface 7 also has a storage recess 11 extending forwardly from a substantially vertically intermediate position on the recess 8 and having a vertical width which is about ⅓ of the vertical width of the recess 10. The recess 11 serves as a recess for accommodating a hinge unit (described later on).

An EVF 12 comprises a frame 13 of synthetic resin having a central opening 14 which is slightly elongate horizontally, an LCD panel 15 fixed to the frame 13 from the back of the frame 13 and having a size that is 3 to 4 inches diagonally across, and a back cover 16 covering the back of the LCD panel 15. The LCD panel 15 is therefore sandwiched at its front and back sides between the frame 13 and the back cover 16, and has a display surface 15a exposed through the opening 14.

Figure 4:
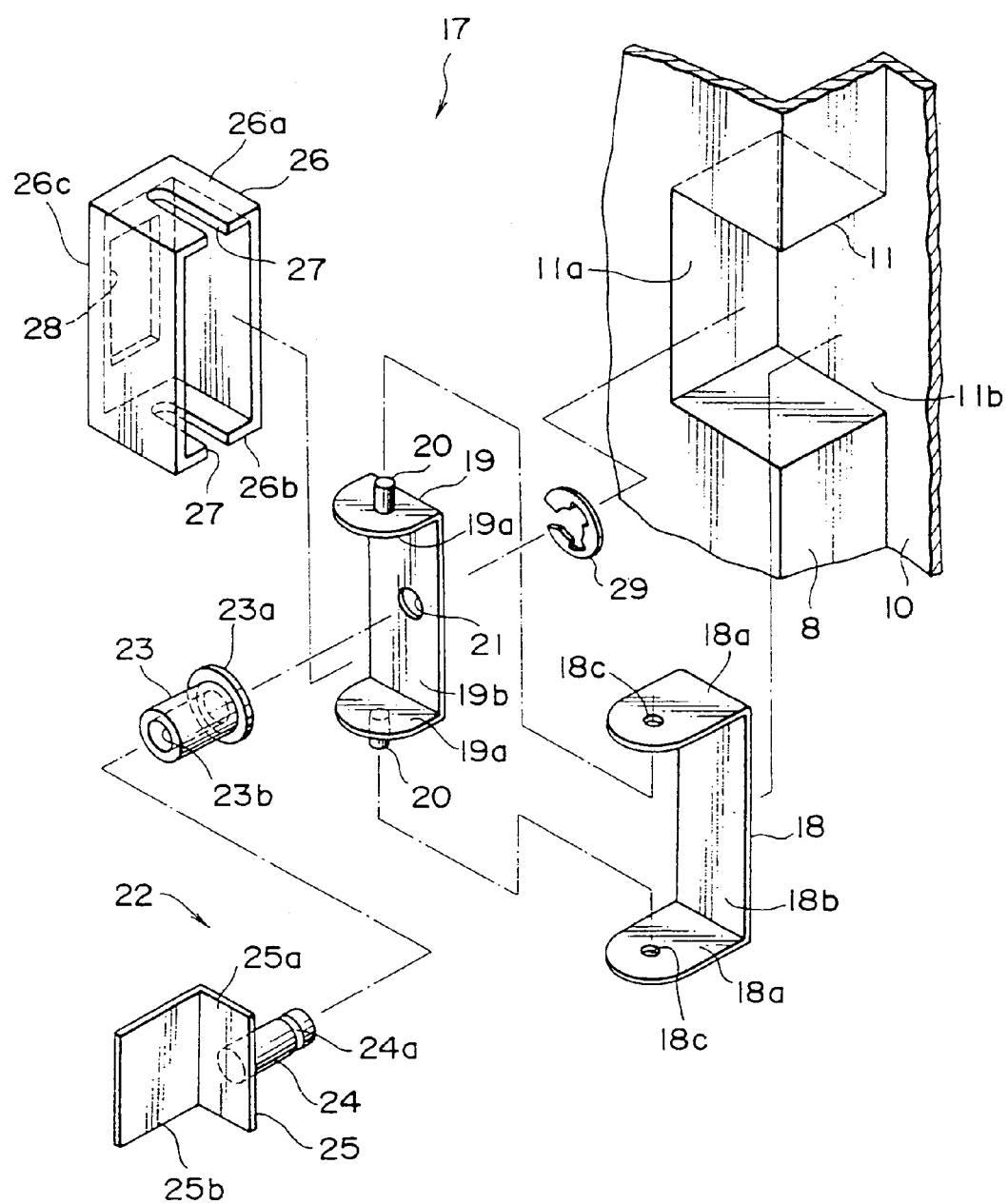
FIG. 4 is an exploded perspective view of a portion of the video camera.

The EVF 12 is coupled to and supported on the video camera body 2 by a joint unit 17 (see FIG. 4). The joint unit 17 allows the EVF 12 to move angularly in the horizontal direction and also move angularly (rotate) about an axis perpendicular to the axis about which the EVF 12 is angularly movable in the horizontal direction.

An opening/closing bracket 18, which comprises a metal sheet bent into a substantially channel shape in its vertical cross section, has a pair of support members 18a extending horizontally from its upper and lower ends and having rounded outer edge corners, and a fixed member 18b extending intermediate between the support members 18a.

The support members 18a have respective support holes 18c which receive respective pivot shafts of an opening/closing hinge unit (described later), so that the opening/closing hinge unit is angularly movably supported by the support members 18a.

Figure 6:
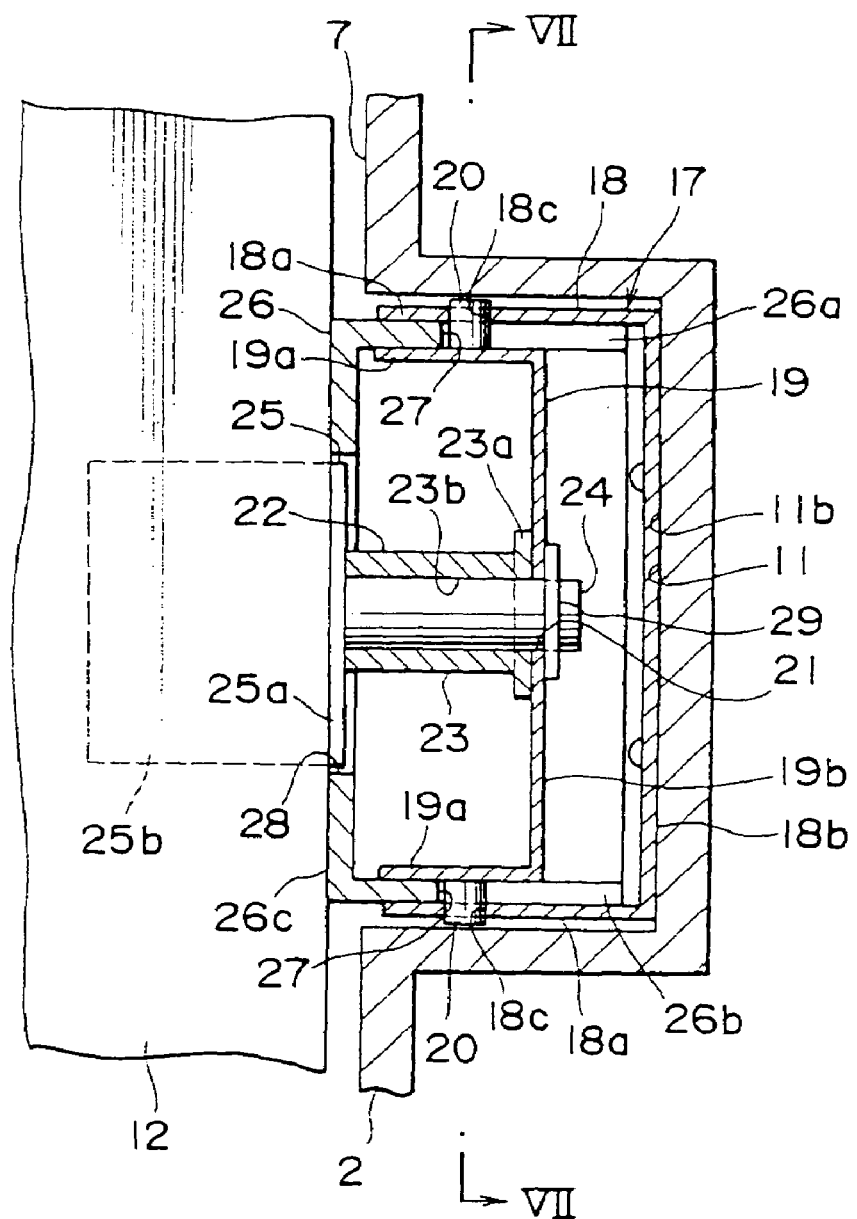
FIG. 6 is a cross-sectional view taken along line VI—VI of FIG. 5.

The opening/closing bracket 18 is disposed in the recess 11 such that, as shown in FIG. 6, the fixed member 18b is fastened by screws or the like to a side surface 11b which is the bottom surface of the concave recess 11 that is formed in the surface of the video camera body 2, with the support members 18a extending horizontally in confronting relation to each other.

An opening/closing hinge unit 19, which comprises a metal sheet bent into a substantially channel shape in its vertical cross section, has a pair of support members 19a extending horizontally from its upper and lower ends, and a rotation unit support 19b extending vertically between the support members 19a.

The support members 19a have rounded outer edge corners and support integral pivot shafts 20, respectively, which project upwardly and downwardly from respective central regions thereof.

The rotation unit support 19b has a central through hole 21 defined therein which has an inside diameter that is slightly larger than the outside diameter of the shaft of a rotation unit (described later on).

The opening/closing hinge unit 19 is supported in vertically sandwiched relation to the opening/closing bracket 18 within the recess 11 by the pivot shafts 20 inserted in the respective support holes 18c. The opening/closing hinge unit 19 is horizontally angularly movable about the pivot shafts 20 that extend vertically.

A rotation unit 22 comprises a substantially cylindrical base 23 and a shaft 24.

The base 23 has an integral circular attachment flange 23a on one end thereof and a central support hole 23b extending axially therethrough from one end to the other.

The shaft 24 has an outside diameter slightly smaller than the inside diameter of the support hole 23b of the base 23, i.e., an outside diameter which allows the shaft 24 to be rotated in the support hole 23b, as described later on. A plate-like attachment bracket 25 of substantially L-shaped horizontal cross section has an arm 25a attached integrally as a flange to an end of the shaft 24 perpendicularly to the axis of the shaft 24, and another arm 25b extending from one edge of the arm 25a in the axial direction of the shaft 24 away from the shaft 24. The shaft 24 has an annular groove 24a defined circumferentially in the other end of the shaft 24 for securing an E-ring (described later on) therein.

As shown in FIG. 4, a cover 26 is in the form of an rectangular box having one side open. The cover 26 has a pair of upper and lower walls 26a, 26b having respective slots 27 defined in open edges thereof, and a closed end 26c having an opening 28 defined centrally therein which is of a vertically rectangular shape.

The rotation unit 22 is assembled by inserting the shaft 24 into the support hole 23b from its open end remote from the attachment flange 23a of the base 23 until the arm 25a of the attachment bracket 25 abuts against the end of the base 23.

The rotation unit 22 thus assembled is attached to the rotation unit support 19b of the opening/closing hinge unit 19.

Specifically, the shaft 24 of the rotation unit 22 is inserted into the central through hole 21 in the rotation unit support 19b from the side of the rotation unit support 19b where the support members 19a project horizontally until the attachment flange 23a is held against the edge of the insertion hole 21, and then the attachment flange 23a is fixed to the rotation unit support 19b by suitable fasteners such as screws or the like (not shown).

Then, an E-ring 29 is placed in the annular groove 24a of the shaft 24 which projects out of the through hole 21, thus locking the shaft 24 against removal from the through hole 21.

Figure 7:
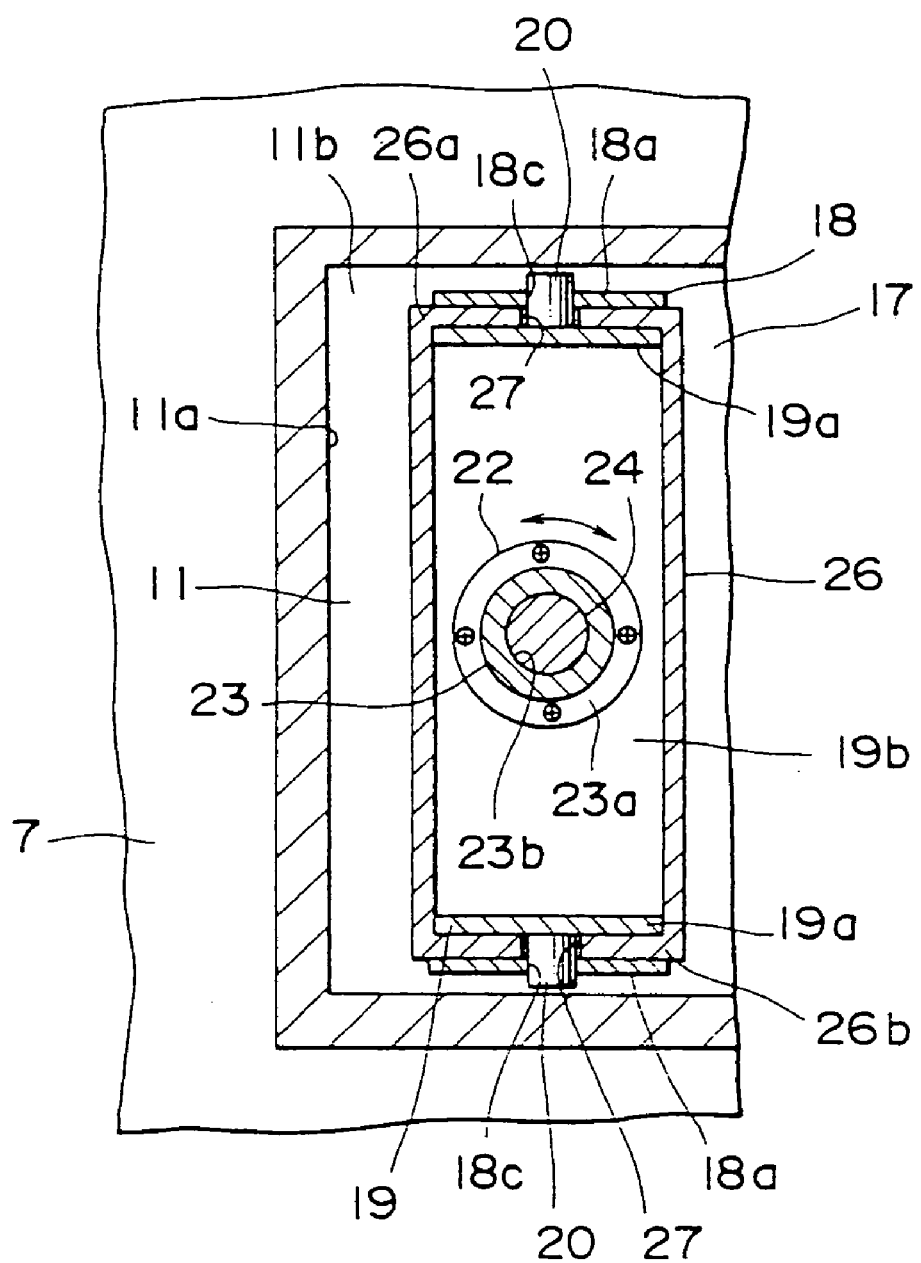
FIG. 7 is a cross-sectional view taken along line VII—VII of FIG. 6.

Finally, as shown in FIGS. 6 and 7, the cover 26 is fitted over the opening/closing hinge unit 19 from the side where the attachment bracket 25 projects so as to cover the joint unit 17 substantially in its entirety. The pivot shafts 20 now project upwardly and downwardly through the respective slots 27, and the attachment bracket 25 on the end of the shaft 24 of the rotation unit 22 projects from the opening 28 of the cover 26.

Figure 5:
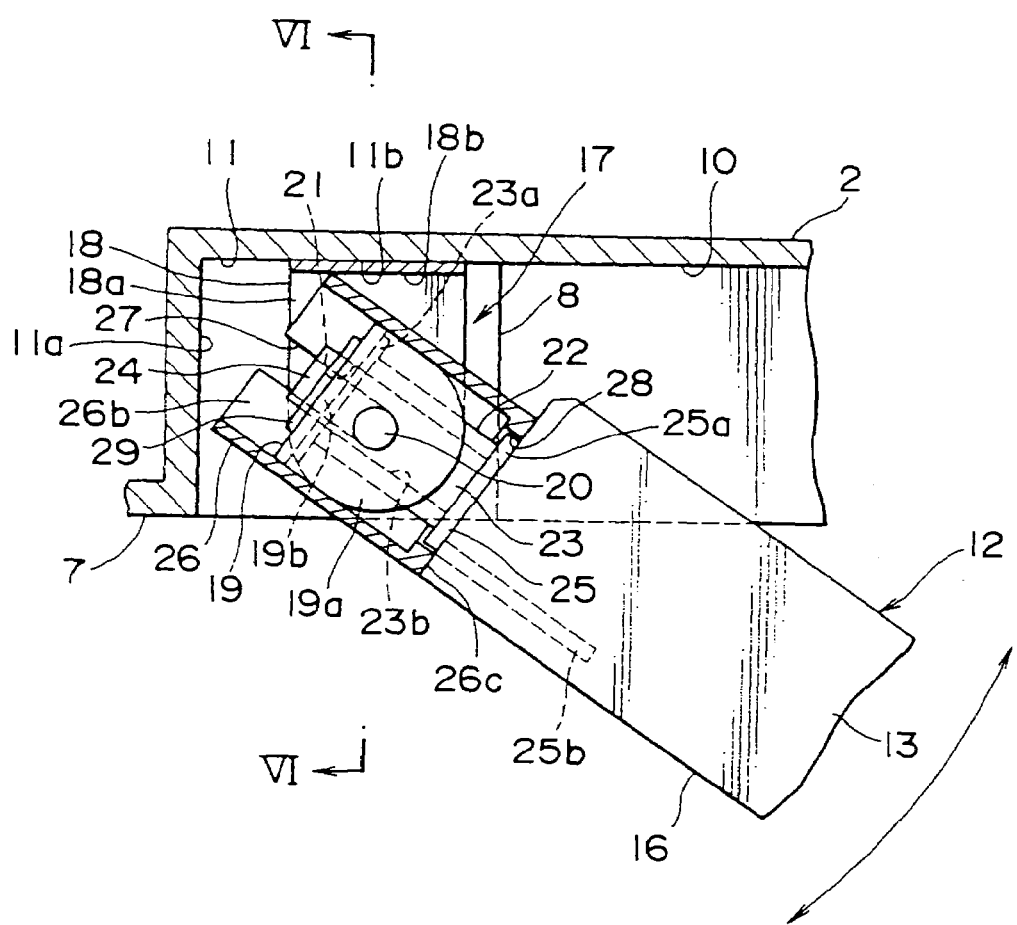
FIG. 5 is an enlarged horizontal cross-sectional view of the portion shown in FIG. 4.

The opening/closing hinge unit 19 and the rotation unit 22 are now integrally combined with each other as shown in FIGS. 5 through 7. The attachment bracket 25 is angularly movable horizontally about the pivot shafts 20 and at the same time rotatable about the shaft 24 of the rotation unit 22 which extends in the direction perpendicular to the pivot shafts 20.

The EVF 12 is attached to and supported on the attachment bracket 25. For example, though not shown in detail, screw holes may be defined in the arms 25a, 25b of the attachment bracket 25, and the arm 25a may be fastened to the frame 13 by screws whereas the arm 25b may be fastened to the back cover 16 by screws.

FIGS. 8 through 13 show a joint unit 17A for a video camera 1 according to a modification of the present invention.

The joint unit 17A is different from the joint unit 17 in that a lock means is added to the joint unit 17 and certain different structures are necessitated by the lock means. Those parts of the video camera according to the modification which are identical to those of the video camera according to the above embodiment are denoted by identical reference numerals, and will not be described in detail below.

Opening/closing brackets 40, each comprising a metal sheet bent into a channel shape in its vertical cross section, have respective support members 40a on one end each having rounded outer edge corners and respective fixed members 40b on the other end.

The support members 40a of the respective opening/closing brackets 40 have support holes 40c defined therein which receive the respective pivot shafts 20 of the opening/closing hinge unit 19, so that the opening/closing hinge unit 19 is angularly movably supported by the support members 40a.

Figure 8:
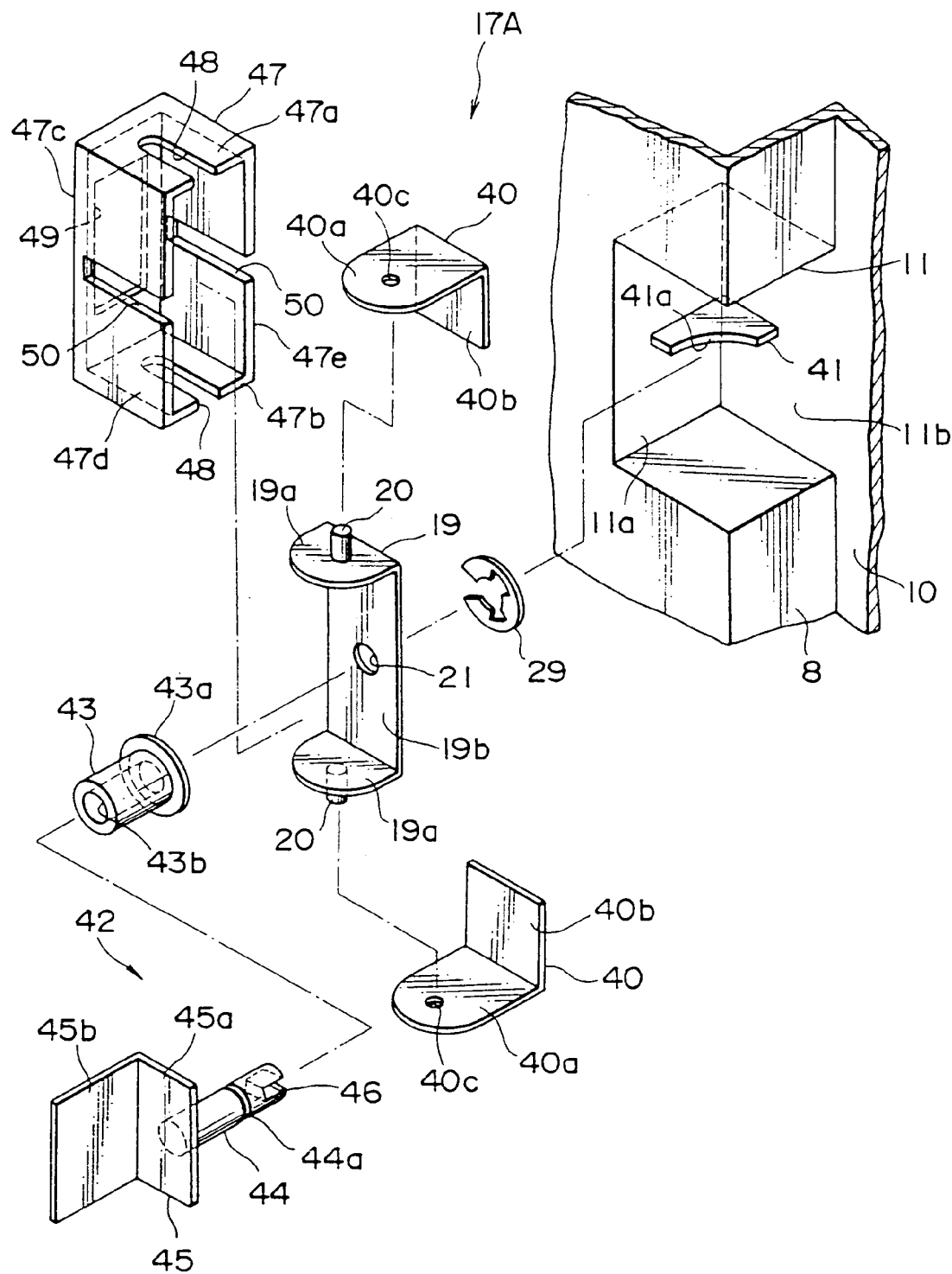
FIG. 8 is an exploded perspective view of a video camera according to a modification of the present invention.

As shown in FIG. 8, a guide rib 41 is disposed in a substantially vertically intermediate position in the recess 11, and extends horizontally from a front side surface 11a of the recess 11 and also from the side surface 11b which is the bottom surface of concave recess 11 that is defined in the surface of the video camera body 2.

The guide rib 41 has an edge 41a, i.e., an end surface facing obliquely rearwardly to the left, curved as an arcuately concave surface.

Figure 10:
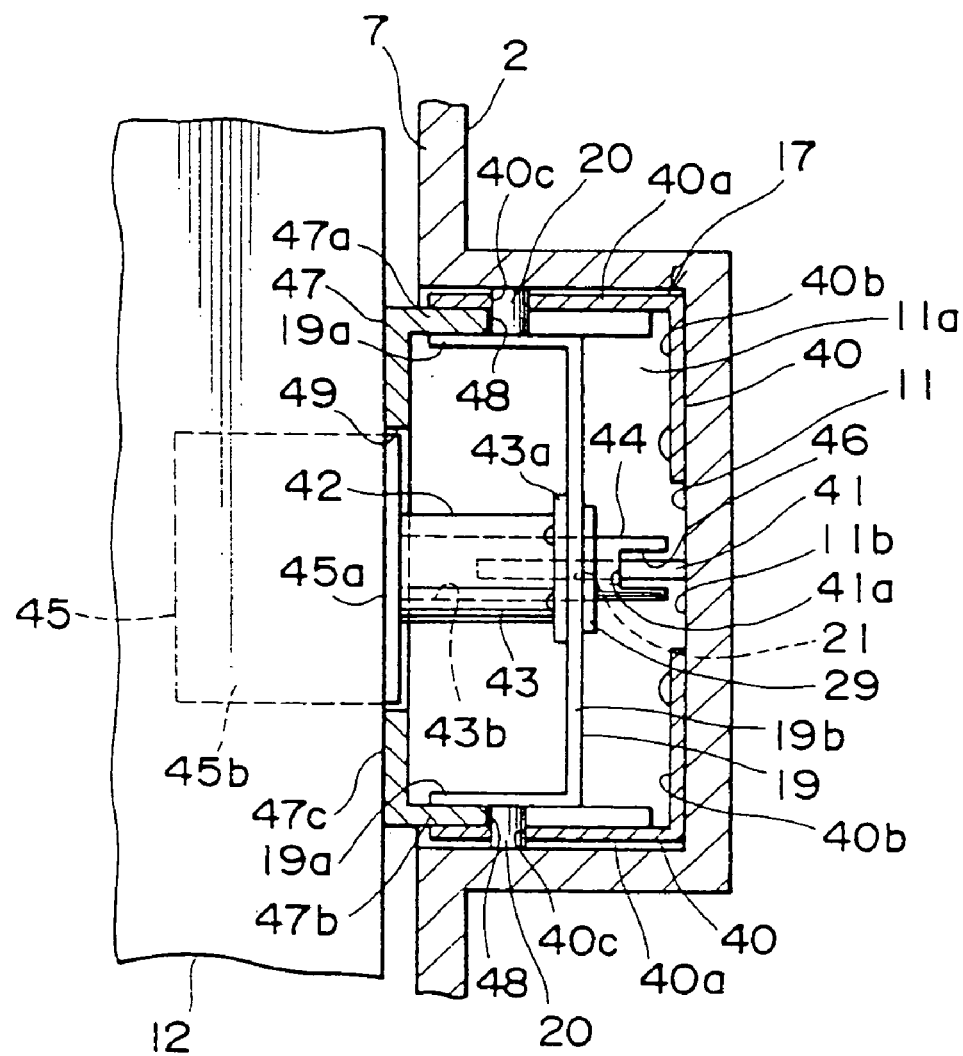
FIG. 10 is a cross-sectional view taken along line X—X of FIG. 9.

The opening/closing brackets 40 are fixedly mounted in the recess 11 by suitable fasteners such as screws or the like such that, as shown in FIG. 10, the fixed members 40b are attached to the side surface 11b in vertically sandwiching relation to the guide rib 41 and the support members 40a extend horizontally in confronting relation to each other.

When the pivot shafts 20 are inserted in the respective support holes 40c of the opening/closing brackets 40 in the recess 11, the opening/closing hinge unit 19 is supported in vertically sandwiched relation to the opening/closing brackets 40, and the opening/closing hinge unit 19 is horizontally angularly movable about the pivot shafts 20 that extend vertically.

A rotation unit 42 comprises a substantially cylindrical base 43 and a shaft 44.

The base 43 has an integral circular attachment flange 43a on one end thereof and a central support hole 43b extending axially therethrough from one end to the other.

The shaft 44 has an outside diameter slightly smaller than the inside diameter of the support hole 43b of the base 43, i.e., an outside diameter which allows the shaft 24 to be rotated in the support hole 43b, as described later on. A plate-like attachment bracket 45 of substantially L-shaped horizontal cross section has an arm 45a attached integrally as a flange to an end of the shaft 44 perpendicularly to the axis of the shaft 44, and another arm 45b extending from one edge of the arm 45a in the axial direction of the shaft 44 away from the shaft 44. The shaft 44 has a slit 46 defined axially in the other end thereof and an annular groove 44a defined circumferentially therein at a position that is slightly displaced from the slit 46 toward the end of the shaft 44 on which the attachment bracket 45 is mounted.

The slit 46 of the shaft 44 and the attachment bracket 45 are of such a positional relationship that the slit 46 extends in a direction at an angle of about 90 degrees with respect to, i.e., perpendicular to, the direction of the edge of the arm 45b remote from its edge contiguous to the arm 45a, as viewed in the axial direction of the shaft 44.

As shown in FIG. 8, a cover 47 is in the form of an rectangular box having one side open. The cover 47 has a pair of upper and lower walls 47a, 47b having respective slots 48 defined in open edges thereof, and a closed end 47c having an opening 49 defined centrally therein which is of a vertically rectangular shape. Furthermore, the cover 47 has a pair of left and right side walls 47d, 47e having respective slits 50 defined in respective vertically intermediate portions thereof and extending horizontally from the open edges thereof toward the closed end 47c. As described later on, the slits 50 serve to keep the side walls 47d, 47e out of interference with the guide rib 41 when the cover 47 fitted over the opening/closing hinge unit 19 is angularly moved in the recess 11 in response to angular movement of the EVF 12.

The rotation unit 42 is assembled by inserting the slitted end of the shaft 44 into the support hole 43b from its open end remote from the attachment flange 43a of the base 43 until the arm 45a of the attachment bracket 45 abuts against the end of the base 43.

The rotation unit 42 thus assembled is attached to the rotation unit support 19b of the opening/closing hinge unit 19.

Specifically, the shaft 44 of the rotation unit 42 is inserted into the central through hole 21 in the rotation unit support 19b from the side of the rotation unit support 19b where the support members 19a project horizontally until the attachment flange 43a is held against the edge of the insertion hole 21, and then the base 43 is fixed to the opening/closing hinge unit 19 by suitable fasteners such as screws or the like (not shown).

Then, the E-ring 29 is placed in the annular groove 44a of the shaft 44 which projects out of the through hole 21, thus locking the shaft 44 against removal from the through hole 21.

Figure 9:
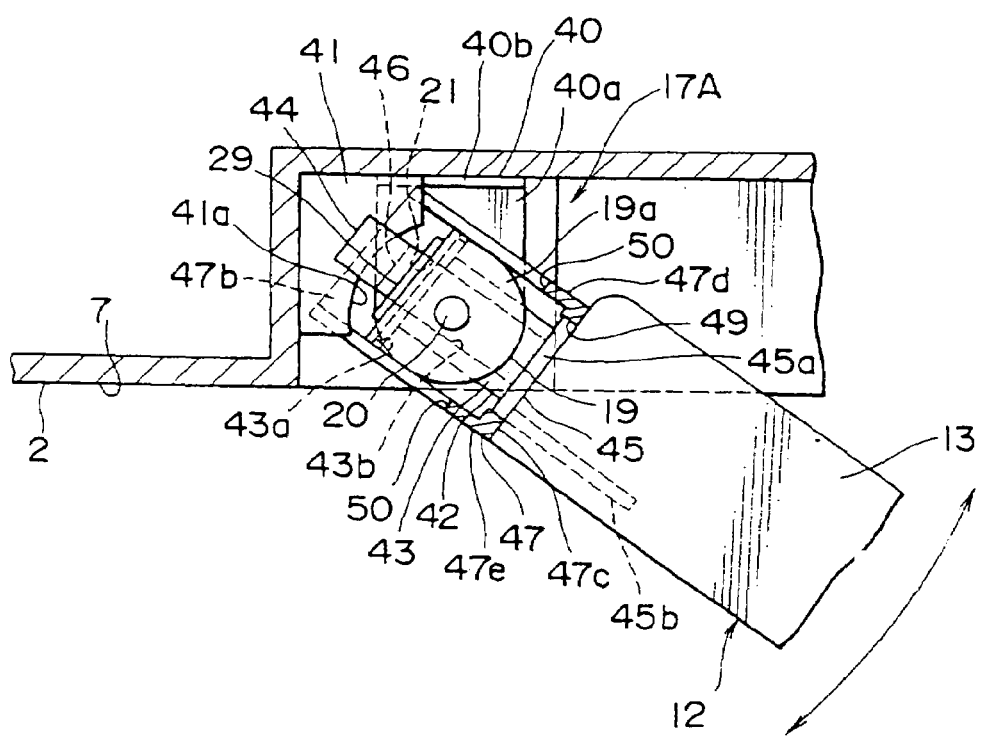
FIG. 9 is an enlarged horizontal cross-sectional view of a portion of the video camera according to the modification in FIG. 8.

Finally, as shown in FIGS. 9 and 10, the cover 47 is fitted over the opening/closing hinge unit 19 from the side where the attachment bracket 45 projects so as to cover the joint unit 17A substantially in its entirety. The pivot shafts 20 now project upwardly and downwardly through the respective slots 48, and the attachment bracket 45 on the end of the shaft 44 of the rotation unit 42 projects from the opening 49 of the cover 47.

Figure 11:
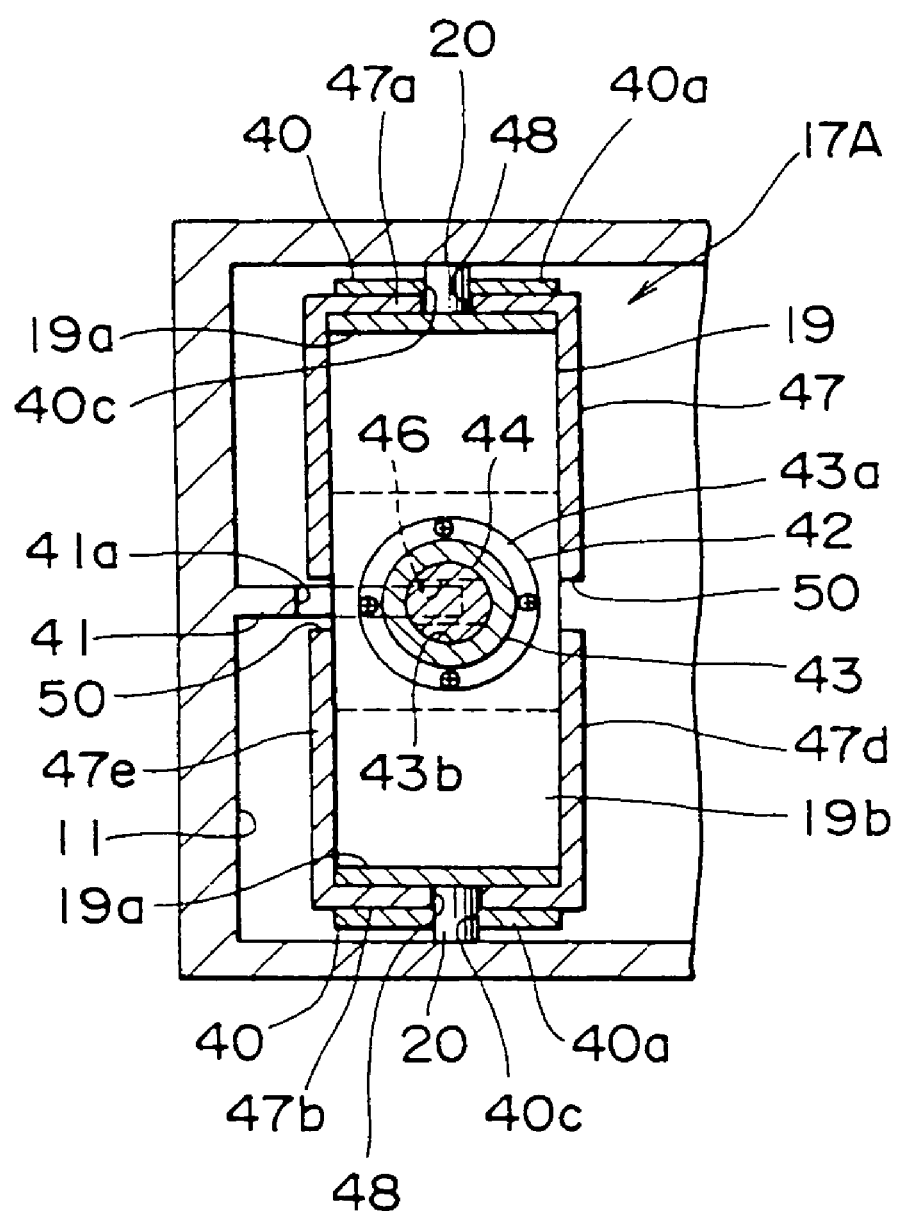
FIG. 11 is a cross-sectional view taken along line XI—XI of FIG. 10.

The opening/closing hinge unit 19 and the rotation unit 42 are now integrally combined with each other as shown in FIGS. 9 through 11. The attachment bracket 45 is angularly movable horizontally about the pivot shafts 20 and at the same time rotatable about the shaft 44 of the rotation unit 42 which extends in the direction perpendicular to the pivot shafts 20.

As with the embodiment described previously, the EVF 12 is attached such that the arm 45a of the attachment bracket 45 is fastened to the frame 13 whereas the other arm 25b is fastened to the back cover 16.

The joint unit 17A thus assembled is accommodated in the recess 11 that is defined in the video camera body 2 of the video camera 1. When the slitted end of the shaft 44 of the rotation unit 42 is positioned in a certain range with respect to the guide rib 41 that extends horizontally in the recess 11, the guide rib 41 is engaged in the slit 46 and hence is vertically sandwiched in the slit 46.

Therefore, the movement of the joint unit 17A is limited by the positional relationship between the guide rib 41 and the slit 46 of the shaft 44.

Operation of the joint unit 17A will be described below with reference to FIGS. 12 and 13.

As described above, the guide rib 41 has its edge 41a arcuately curved as viewed from above. The center of curvature of the arcuate edge 41a lies at the central axis of the pivot shafts 20, i.e., is aligned with the axis about which the opening/closing hinge unit 19 is angularly movable. The arcuate edge 41a is included as an arc in a sector which subtends an angle of 90 degrees or less.

Figure 12:
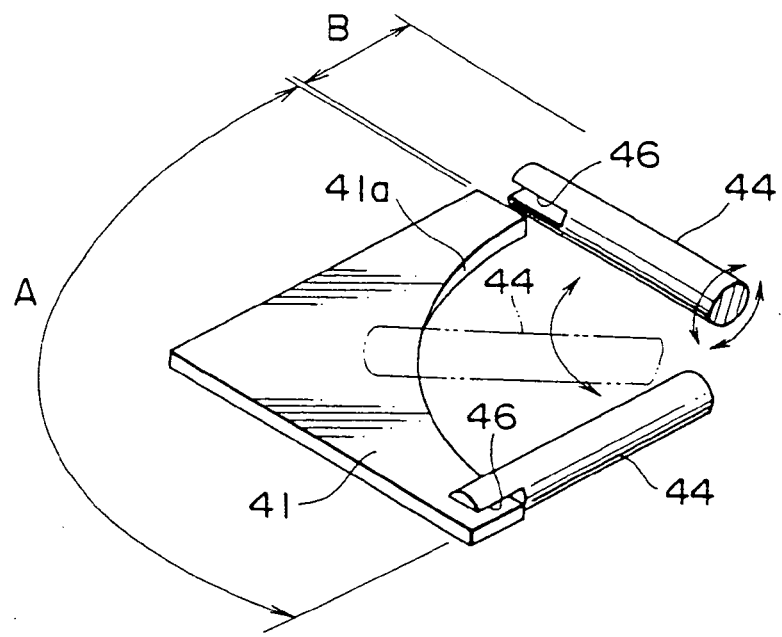
FIG. 12 is a schematic perspective view illustrative of the principles of operation of the video camera.
Figure 13:
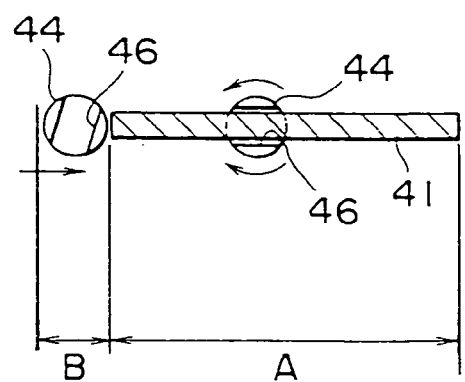
FIG. 13 is a view illustrative of the principles of operation of the video camera as viewed in a direction different from the direction in which it is viewed as shown in FIG. 12.

When the shaft 44 of the rotation unit 42 is positioned in a range A shown in FIGS. 12 and 13, the shaft 44 (the rotation unit 42) is unable to rotate because the arcuate edge 41 of the guide rib 41 engages in the slit 46 in the tip end of the shaft 44.

When the shaft 44 of the rotation unit 42 is positioned in a range B, the shaft 44 is able to rotate freely about its own axis because the arcuate edge 41 of the guide rib 41 does not engage in the slit 46 in the tip end of the shaft 44.

From the range B, the shaft 44 cannot angularly move in a direction to have the arcuate edge 41 engage in the slit 46 and hence the opening/closing hinge unit 19 is unable to move angularly rearwardly, i.e., toward the video camera body 2, unless the slit 46 lies parallel to the direction in which the arcuate edge 41a extends.

While the joint unit 17A is making either rotating or angular movements, then the joint unit 17A is incapable of making the other movement. Therefore, when the EVF 12 is in the process of being stored into the recess 11 in the video camera body 2, the EVF 12 cannot be rotated, but remains to face in one direction at all times. Consequently, the EVF 12 is prevented from contacting a portion of the video camera body 2, or the joint unit 17A is prevented from being forcibly damaged. The EVF 12 can be stored accurately in the recess 11 regardless of the orientation of the display surface 15a of the LCD panel 15. When the EVF 12 is opened laterally of the video camera body 2 and the rotation unit 42 is slightly rotated, the EVF 12 cannot be angularly moved toward the video camera body 2. Therefore, the EVF 12 and the joint unit 17 are prevented from suffering damage which would otherwise be caused if the EVF 12 were attempted to be obliquely stored in the recess 11.

In the above embodiment and modification, the joint unit 17 or 17A of the EVF 12 is angularly moved or rotated continuously under no load conditions. If the joint unit 17 or 17A is angularly moved or rotated stepwise or under loaded conditions with a click mechanism, a damper, or the like, then the EVF 12 is prevented from moving accidentally.

While the EVF 12 has been shown as including the LCD panel 15, the present invention is not limited to an EVF incorporating a particular mechanism, but the EVF 12 may comprise a small-size, low-profile CRT for displaying images.

As described above, the video camera according to the present invention has an electronic viewfinder for monitoring a video image produced by an imaging means accommodated in a video camera body, an angularly movable support for supporting a side edge of the electronic viewfinder for angular movement about an axis to move an opposite side edge thereof away from a storage region in a side surface of the video camera body, and an auxiliary angularly moving means for angularly moving the electronic viewfinder about an axis perpendicular to the axis of the angularly movable support, so that one of the face and back sides of the electronic viewfinder can be selected for storing in the storage region.

Therefore, the EVF is angularly movable in two directions, i.e., a first direction to move the opposite side edge thereof away from the storage region in the side surface of the video camera body, and a second direction about the axis perpendicular to the axis about which the opposite side edge of the EVF is movable away from the storage region, and one of the face and back sides of the electronic viewfinder can be selected for storing in the storage region. Consequently, when the EVF is stored with its display surface facing inwardly, the display surface thereof is prevented from being damaged, scratched, or smeared with dust. When the EVF is stored with its display surface exposed for view, the EVF can be used while it is in storage.

Furthermore, the display surface of the EVF can be adjusted freely to achieve an angle for best visibility according to the angle at which the video camera is directed to the object to be imaged.

Although certain preferred embodiments of the present invention have been shown and described in detail, it should be understood that various changes and modifications may be made therein without departing from the scope of the appended claims.

What is claimed is:

1. A video camera comprising:
   a video camera body including a lens system with an optical axis and having a storage recess formed in one side surface thereof;
   imaging means housed in said video camera body for imaging an object and generating a video signal corresponding to an imaged object;
   an electronic viewfinder having a display surface for monitoring the video signal generated by said imaging means and being of a size to fit within said storage recess;
   an angularly movable support attached to said one side surface of said video camera body and attached to a midpoint of a first side edge of said electronic viewfinder for movably supporting said first side edge of said electronic viewfinder for angular movement about a first axis perpendicular to said optical axis, so that in a first position said electronic viewfinder resides in said storage recess and in a second position said electronic viewfinder is positioned at a right angle to said one side surface of said video camera body; and
   auxiliary angularly moving means attached to said angularly movable support at said midpoint of said first side edge of said electronic viewfinder for mounting said electronic viewfinder for 180° rotational movement about a second axis perpendicular to said first axis and perpendicular to said one side surface, so that when said electronic viewfinder is in said first position said electronic viewfinder has one of a first orientation with said display surface facing away from said storage recess and a second orientation with said display surface of said electronic viewfinder facing into said storage recess.

2. A video camera according to claim 1, wherein said angularly movable support comprises a bracket fixed to said video camera body and a hinge unit fixed to said auxiliary angularly moving means.

3. A video camera according to claim 1, wherein said auxiliary angularly moving means comprises an attachment fixed to said angularly movable support and a bracket fixed to said electronic viewfinder.

4. A video camera according to claim 1, wherein said storage recess comprises a rectangular recess having two adjacent perpendicular side walls defined in said one side surface of said video camera body and two open, unbounded sides.

5. A video camera according to claim 1, further comprising means for locking said electronic viewfinder against angular movement about one of said first axis and said second axis while allowing said electronic viewfinder to move angularly about the other of said first axis and said second axis.

6. A video camera comprising:

a video camera body including a lens system with an optical axis and having a storage recess defined in one side surface thereof;

an electronic viewfinder pivotally mounted on said video camera body and having a display surface for monitoring a video signal representative of an image of an object and a back cover surface, said electronic viewfinder being dimensioned to fit into said storage recess; and means operatively connected between said video camera body and to a midpoint of a side edge of said electronic viewfinder for pivotally mounting said electronic viewfinder to pivot angularly into and out of said storage recess about a first axis perpendicular to said optical axis and parallel to said one side surface and also to rotate through 180° about a second axis located at said midpoint of said side edge of said electronic viewfinder and substantially perpendicular to said first axis and perpendicular to said one side surface when said electronic viewfinder is positioned out of said storage recess, so that said electronic viewfinder is stored in said storage recess in one of a first position with said display surface facing said one side surface or stored in said storage recess in a second position with said back cover surface facing said one side surface.

7. A video camera according to claim 6, further comprises:

means for locking said electronic viewfinder against angular movement about said second axis while said electronic viewfinder is positioned in a predetermined angular range about said first axis.

\* \* \* \* \*